(12) United States Patent
Sato

(10) Patent No.: US 12,353,192 B2
(45) Date of Patent: Jul. 8, 2025

(54) MACHINE LEARNING DEVICE, COMPUTER DEVICE, CONTROL SYSTEM, AND MACHINE LEARNING METHOD

(71) Applicant: FANUC CORPORATION, Yamanashi (JP)

(72) Inventor: Shuji Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 418 days.

(21) Appl. No.: 17/792,538

(22) PCT Filed: Feb. 1, 2021

(86) PCT No.: PCT/JP2021/003496
§ 371 (c)(1),
(2) Date: Jul. 13, 2022

(87) PCT Pub. No.: WO2021/157515
PCT Pub. Date: Aug. 12, 2021

(65) Prior Publication Data
US 2023/0068058 A1    Mar. 2, 2023

(30) Foreign Application Priority Data

Feb. 5, 2020    (JP) .................................. 2020-018347

(51) Int. Cl.
G05B 19/4155    (2006.01)
G05B 19/418    (2006.01)
G06N 20/00    (2019.01)

(52) U.S. Cl.
CPC ... *G05B 19/4155* (2013.01); *G05B 19/41865* (2013.01); *G06N 20/00* (2019.01)

(58) Field of Classification Search
CPC .......... G05B 19/4155; G05B 19/41865; G06N 20/00; G06N 3/08; G06N 7/01; G06N 3/006

See application file for complete search history.

(56) References Cited

U.S. PATENT DOCUMENTS 6,157,963 A * 12/2000 Courtright, II ......... G06F 3/061
710/5
2015/0094852 A1    4/2015 Laurent et al.
(Continued)

FOREIGN PATENT DOCUMENTS

CN    108628355 A    10/2018
CN    108687137 A    10/2018
(Continued)

OTHER PUBLICATIONS

International Search Report issued Apr. 27, 2021 in corresponding International Application No. PCT/JP2021/003496.
(Continued)

*Primary Examiner* — Yuhui R Pan
(74) *Attorney, Agent, or Firm* — Wenderoth, Lind & Ponack, L.L.P.

(57) ABSTRACT

The machine learning device performs machine learning with respect to a computer device that issues a command for accessing a control device. The machine learning device has a state data acquisition unit that monitors a command issued by one or more applications of the computer device, and acquires state data including a command distribution schedule and reception and distribution times of a command distributed according to the distribution schedule, a behavior information output unit that outputs, to the computer device, behavior information including correction information for the distribution schedule in the state data, a reward calculation unit that calculates a reward with respect to the behavior information based on a distribution delay time of
(Continued)

each command and an average distribution interval of all commands, and a value function update unit that updates a value function with respect to the state data and the behavior information based on the reward.

15 Claims, 10 Drawing Sheets

(56) References Cited

U.S. PATENT DOCUMENTS

| | | | |
|---|---|---|---|
| 2018/0259956 A1 | 9/2018 | Kawamoto | |
| 2019/0036594 A1* | 1/2019 | Takaoki | G06N 20/00 |
| 2019/0101904 A1* | 4/2019 | Shimamura | G05B 19/41825 |

FOREIGN PATENT DOCUMENTS

| | | |
|---|---|---|
| CN | 110214264 A | 9/2019 |
| JP | 2001-191279 | 7/2001 |
| JP | 2007-276052 | 10/2007 |
| JP | 2017-134459 | 8/2017 |
| JP | 2018-36888 | 3/2018 |
| JP | 2019-29856 | 2/2019 |
| JP | 2019-67046 | 4/2019 |
| JP | 6517706 | 5/2019 |
| WO | 2019/207679 A1 | 10/2019 |

OTHER PUBLICATIONS

Volodymyr Mnih et al., "Human-level control through deep reinforcement learning", URL: http://files.davidqiu.com/research/nature14236.pdf, Nature, vol. 518, pp. 1-13, Published on Feb. 26, 2015.

* cited by examiner

| COMMAND RECEPTION NUMBER | COMMAND NUMBER | COMMAND PRIORITY Pa | COMMAND PROCESS ID | PROCESS PRIORITY Pb | OVERALL PRIORITY Ps(=Pa+Pb) | REQUIRED PROCESSING TIME Tc | DELAY FACTOR Td | DELIVERY SCHEDULE | |
|---|---|---|---|---|---|---|---|---|---|
| | | | | | | | | DELIVERY ORDER | DELIVERY INTERVAL Ts(=Tc+Td) |
| 1 | 21 | 12 | 2013 | 4 | 16 | 25 | 8 | 1 | 33 |
| 2 | 15 | 9 | 2420 | 1 | 10 | 26 | 8 | 5 | 34 |
| 3 | 18 | 11 | 2036 | 3 | 14 | 18 | 4 | 3 | 22 |
| 4 | 8 | 12 | 3035 | 2 | 14 | 20 | 4 | 2 | 24 |
| 5 | 30 | 10 | 3621 | 3 | 13 | 16 | 0 | 4 | 16 |

FIG. 4

| COMMNAD NUMBER | DELIVERY DELAY TIME Tb | COMMAND PRIORITY Pa | DELIVERY INTERVAL | EVALUATION VALUE V |
|---|---|---|---|---|
| 21 | 25 | 12 | 24 | 120 |
| 15 | 36 | 9 | 28 | 96 |
| 18 | 18 | 11 | 13 | 222 |
| 8 | 20 | 12 | 15 | 180 |
| 30 | 16 | 10 | 26 | 260 |

AVERAGE DELIVERY INTERVAL Ta: 21
REWARD r: 176

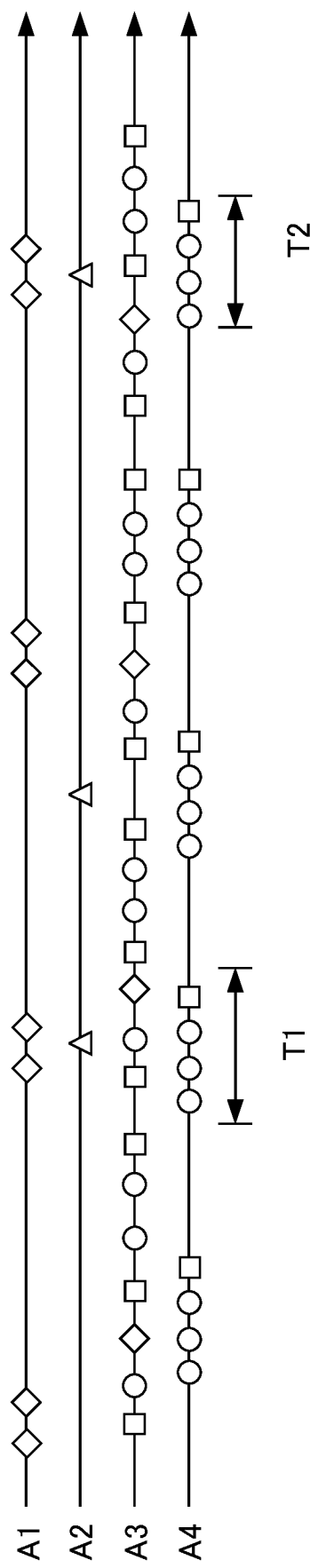

MACHINE LEARNING DEVICE, COMPUTER DEVICE, CONTROL SYSTEM, AND MACHINE LEARNING METHOD

TECHNICAL FIELD

The present invention relates to a machine learning device, a computer device, a control system, and a machine learning method.

BACKGROUND ART

For example, a computer device (e.g., personal computer, tablet terminal, smart phone) connected to a control device that controls industrial machine such as machine tools and robots, includes a communication processing unit that serves as an interface with the control device, so that applications running on the computer device access data in the control device.

The applications that access data in the control device include those that access frequently with little or no interval, those that access regularly, and those that access sporadically.

In such a state in which many applications run simultaneously, applications that frequently access data in the control device can interfere with the access of other applications, which can often delay the access of the other applications and slow down the overall operation of the applications.

In this regard, the following technique is known: The priority of data set by applications of a personal computer as a computer device is transmitted to a numerical control device as a control device. When a plurality of data are requested from applications of the personal computer, the numerical control device first transmits high-priority data and stores it in a buffer, and adjusts a transmission interval according to the load on the numerical control device and the allowable response time. For example, see Patent Document 1.

Patent Document 1: Japanese Patent No. 6517706

DISCLOSURE OF THE INVENTION

Problems to be Solved by the Invention

In the control device connected to the computer device, when an application, which does not consider overall performance, frequently accesses the control device, or when a very large number of applications access the control device simultaneously, performance degradation due to access delays and processing delays occur.

FIG. 10 shows an example of a time chart of commands output by a plurality of applications running on a personal computer as a computer device. FIG. 10 shows a case where the personal computer as the computer device executes four applications A1 to A4. FIG. 10 shows that the urgency increases in the order of circular, square, diamond, and triangle commands, with the triangle commands having the highest urgency.

As shown in FIG. 10, the application A1 regularly outputs commands with relatively high urgency to access data in the control device. The application A2 sporadically outputs commands with the highest urgency to access data in the control device. The application A3 frequently outputs commands to frequently access data in the control device. The application A4 regularly outputs several commands to access data in the control device.

In the case of FIG. 10, for example, at times T1 and T2, commands of the applications A1 to A4 are concentrated, resulting in excessive access to the control device. Issues that can occur in such a state include irregular access to data that should be processed on a regular basis, delays in processing events that should be processed immediately, and overall slow operation of the applications.

Patent document 1 is limited to the efficiency of returning data by a numerical control device in response to data request commands, and cannot improve the efficiency of delivering commands from a personal computer as a computer device to the numerical control device as a control device and cannot reduce the load on the numerical control device, and has no effect on the transmission data of write requests.

In addition, in conventional technology, to adjust command delivery to the control device, individual applications need to be modified.

Therefore, it is desired to prevent commands for data communication from being excessively delivered to and overloading a control device, and to reduce the delivery delay time of the commands.

Means for Solving the Problems (1) An aspect of a machine learning device of the present disclosure is a machine learning device for performing machine learning with respect to a computer device that issues a command for accessing a control device communicably connected to the computer device. The machine learning device includes a state data acquisition unit, an action information output unit, a reward calculation unit, and a value function update unit. The state data acquisition unit monitors the command for accessing data in the control device, the command being commanded by each of one or more applications running on the computer device, and acquires state data including at least a delivery schedule of the command and a reception time and a delivery time of the command delivered based on the delivery schedule. The action information output unit outputs, to the computer device, action information including modification information of the delivery schedule included in the state data. The reward calculation unit calculates a reward for the action information based on a delay time of each of the commands until each of the commands is delivered to the control device and an average delivery interval of all of the commands delivered. The value function update unit updates a value function related to the state data and the action information based on the reward calculated by the reward calculation unit.

(2) An aspect of a computer device of the present disclosure includes the machine learning device according to (1). The delivery schedule is machine-learned by the machine learning device.

(3) An aspect of a control system of the present disclosure includes the machine learning device according to (1), and a computer device in which the delivery schedule is machine-learned by the machine learning device.

(4) An aspect of a machine learning method of the present disclosure is a machine learning method for performing machine learning with respect to a computer device that issues a command for accessing a control device communicably connected to the computer device. The machine learning method includes: monitoring the command for accessing data in the control device, the command being commanded by each of one or more applications running on the computer device, and acquiring state data including at least a delivery schedule of the command and a reception time and a delivery time of the command delivered based on the delivery schedule; outputting, to the computer device, action information including modification information of the delivery schedule included in the state data; calculating a reward for the action information based on a delay time of each of the commands until each of the commands is delivered to the control device and an average delivery interval of all of the commands delivered; and updating a value function related to the state data and the action information based on the calculated reward.

Effects of the Invention

According to an aspect, it is possible to prevent commands for data communication from being excessively delivered to and overloading a control device, and to reduce the delivery delay time of the commands.

BRIEF DESCRIPTION OF THE DRAWINGS

FIG. 2 shows an example of a command table including a delivery schedule;

FIG. 4 shows an example of the reward for each command calculated by a reward calculation unit;

FIG. 10 shows an example of a time chart of commands output by a plurality of applications running on a personal computer.

PREFERRED MODE FOR CARRYING OUT THE INVENTION

One embodiment of the present disclosure will now be described below with reference to the drawings.

One Embodiment

Figure 1:
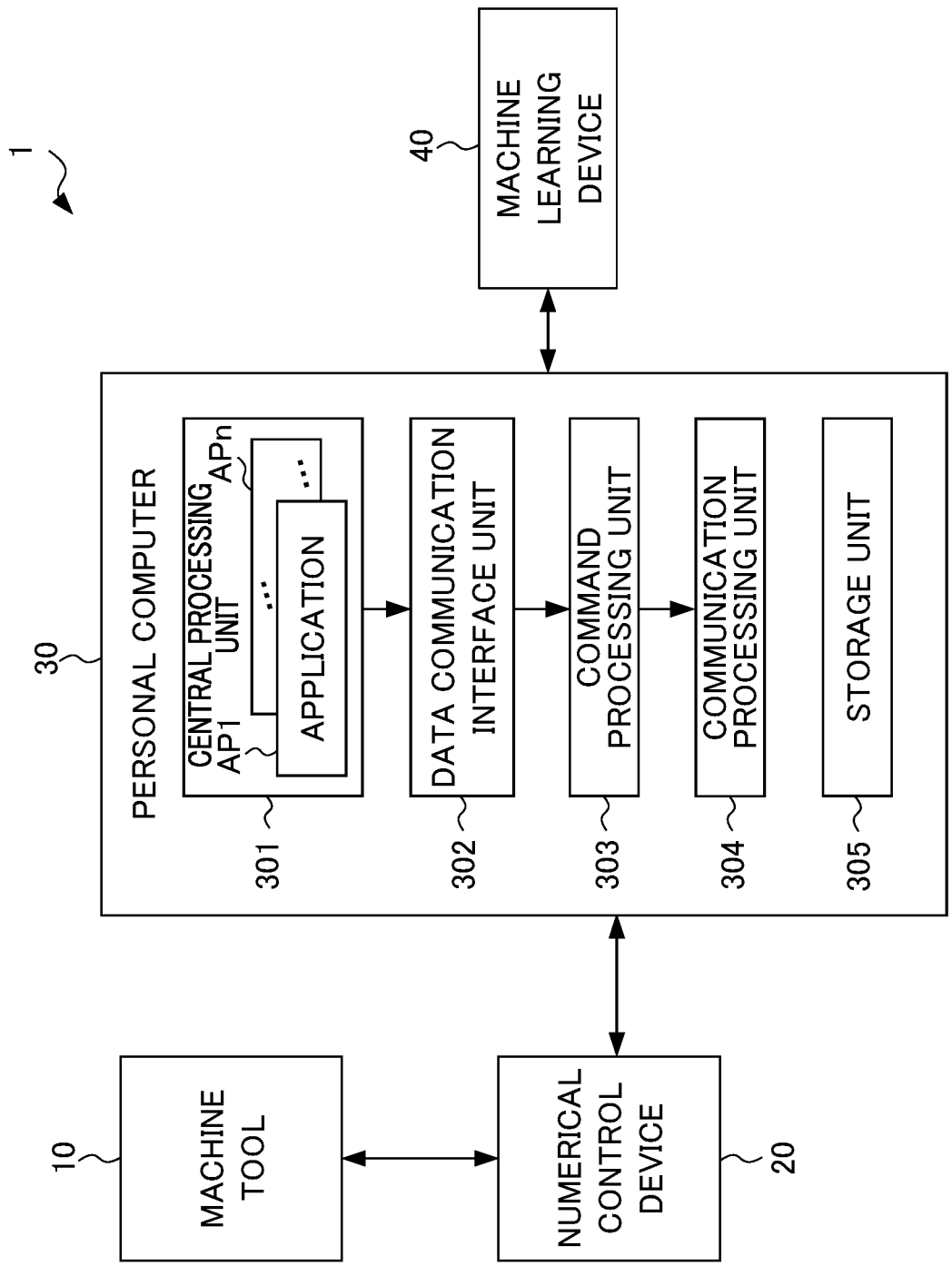
FIG. 1 is a functional block diagram showing an example of the functional configuration of a control system according to one embodiment.

FIG. 1 is a functional block diagram showing an example of the functional configuration of a control system according to one embodiment. Here, a machine tool is exemplified as industrial machine, and a numerical control device is exemplified as a control device. The present invention is not limited to machine tools, and can be applied to industrial robots and service robots, for example. If the industrial machine is a robot, the control device includes a robot control device. Although a personal computer is exemplified as a computer device, the present invention is not limited to personal computers, and can be applied to so-called client terminals, such as tablet terminals and smartphones, for example.

As shown in FIG. 1, a control system 1 includes a machine tool 10, a numerical control device 20, a personal computer 30, and a machine learning device 40.

The machine tool 10, the numerical control device 20, the personal computer 30, and the machine learning device 40 may be directly connected to one another via a connection interface (not shown). Alternatively, the machine tool 10, the numerical control device 20, the personal computer 30, and the machine learning device 40 may be connected to one another over a network (not shown) such as a local area network (LAN) or the Internet. In this case, the machine tool 10, the numerical control device 20, the personal computer 30, and the machine learning device 40 each include a communication unit (not shown) to communicate with one another through such a connection. As described below, the personal computer 30 may include the machine learning device 40. The numerical control device 20 may be included in the machine tool 10.

The machine tool 10 is a machine tool known to those skilled in the art, and operates based on control information received from the numerical control device 20 described below.

The numerical control device 20 is a numerical control device known to those skilled in the art, and generates operational commands based on control information and transmits the generated operational commands to the machine tool 10. Thus, the numerical control device 20 controls the operation of the machine tool 10. In addition, the numerical control device 20 receives commands for data communication for each of applications AP1 to APn, which are n number of applications running on the personal computer 30 described below, to access data in the numerical control device 20, and transmits the data to the personal computer 30 in the order of the received commands. Here, n is an integer of 2 or more.

<Personal Computer 30>

The personal computer 30 includes a central processing unit 301, a data communication interface unit 302, a command processing unit 303, a communication processing unit 304, and a storage unit 305.

The central processing unit 301 is one known to those skilled in the art and includes a central processing unit (CPU), a read only memory (ROM), a random access memory (RAM), and a complementary metal-oxide-semiconductor (CMOS) memory. These are configured to communicate with one another via a bus.

The CPU is a processor that controls the personal computer 30 as a whole. The CPU reads out a system program and the programs of n number of applications AP1 to APn stored in the ROM via a bus, and controls the entire personal computer 30 according to the system program and the programs of the applications AP1 to APn. The RAM stores various data such as temporary calculation data and display data. The CMOS memory is backed up by a battery (not shown), and is configured as a non-volatile memory that retains its storage state even when the power of the numerical control device 20 is turned off.

The data communication interface unit 302 is a common communication interface and, for example, includes a buffer (not shown). The data communication interface unit 302 receives commands for data communication for accessing data in the numerical control device 20 and temporarily stores the received command data in the buffer (not shown).

The command processing unit 303, for example, acquires the commands stored in the buffer (not shown) of the data communication interface unit 302 based on a delivery schedule, and delivers the acquired commands via the communication processing unit 304.

Here, the delivery schedule will be described. In the present embodiment, as the delivery schedule, the "delivery order" and "delivery interval" of each of the commands stored in the buffer of the data communication interface unit 302 are set.

Thus, in the present embodiment, a command table CT is introduced as a feature for determining the delivery schedule. The command table CT refers to an array table indexed by command numbers, in which the commands for data communication for accessing data in the numerical control device 20 are each associated with data such as "command number", "command reception number", "command priority Pa", "command process ID", "process priority Pb", "overall priority Ps", "required processing time Tc", "delay factor Td", and "delivery schedule".

The "command number" in the command table CT is an identification number to identify each of commands commanded by the applications AP1 to APn, and is an index in the command table CT. The command number shall be identified for each application APi ($1 \leq i \leq n$) that issues the command in question.

The "command reception number" in the command table CT indicates the reception number of a command received by the data communication interface unit 302 from each of the applications AP1 to APn and stored in the buffer (not shown).

The "command priority Pa" in the command table CT is a value indicating the priority of the command in question, and shall be set in advance so that the greater the value, the higher the priority for execution. The "command priority Pa" may be set in advance so that the smaller the value, the higher the priority for execution.

The "command process ID" in the command table CT is a process ID, is assigned by the operating system (OS) of the personal computer 30 when the process is started, and is an identifier for the 03 or another process to designate and work on the process.

The "process priority Pb" in the command table CT is a coefficient indicating the priority of a process that commanded a command. The "process priority Pb" is, for example, initially set to "1", and is at least one coefficient parameter included in an action selected by the machine learning device 40 described below.

The "overall priority Ps" in the command table CT is the total value of the "command priority Pa" and the "process priority Pb", and commands are delivered in descending order of value. For example, if the "overall priority Ps" is the same for two or more different commands, it may be set in advance so that the command processing unit 303 preferentially delivers a command with a higher "command priority Pa".

Also, it may be set in advance that the command processing unit 303 preferentially delivers a command with a higher "process priority Pb".

The "required processing time Tc" in the command table CT indicates the period of time required to process the command in question, and it is desirable that the next command delivery is performed after an interval of at least this period of time.

The "delay factor Td" in the command table CT is a time factor that adjusts the delivery interval of the command based on the "required processing time Tc". Specifically, a value obtained by adding the "delay factor Td" of a command to the "required processing time Tc" of the command is defined as the "delivery interval Ts" of the command. By adjusting the "delay factor Td", the optimal delivery interval of each command can be adjusted.

The "delivery order" in the "delivery schedule" in the command table CT is the order in which the command processing unit 303 delivers commands stored in the buffer (not shown) of the data communication interface unit 302 based on the "overall priority Ps" as described above.

The "delivery interval Ts" in the "delivery schedule" in the command table CT is the total value of the "required processing time Tc" and the "delay factor Td", and the command processing unit 303 delivers each command at a time interval of the "delivery interval. Ts".

The command table CT when the machine learning device 40 starts learning may be optionally set by a user.

FIG. 2 shows an example of the command table CT. With reference to FIG. 2, the command table CT contains an array of data pertaining to five commands for simplicity of description.

As shown in FIG. 2, the delivery order of these five commands is set in descending order of the overall priority value. With respect to command numbers 18 and 8, which have the same value of overall priority, as mentioned above, it can be seen that command number 8 with a higher value of the "command priority Pa" is prioritized.

As described above, the delivery interval of each command is set by adding the delay factor of each command to the required processing time for each command.

As described below, the machine learning device 40 uses the "process priority Pb" and "delay factor Td" as an action, selects various actions, for example, based on a policy, and performs reinforcement learning through exploration, and thereby can select the optimal delivery schedule.

The communication processing unit 304 is a communication unit known to those skilled in the art and transmits and receives data, processing programs, etc. to and from the numerical control device 20.

Specifically, the communication processing unit 304 sequentially transmits commands received from the command processing unit 303 to the numerical control device 20 and receives data in response to the transmitted commands.

The storage unit 305 includes a RAM and a hard disk drive (HDD). The storage unit 305 stores the system program, the programs of the n number of applications AP1 to APn, the command table CT, and so on.

<Machine Learning Device 40>

The machine learning device 40 is a device that performs reinforcement learning of the delivery schedule of undelivered commands of the applications AP1-APn stored in the buffer (not shown) of the data communication interface unit 302 when the personal computer 30 executes the programs of the application AP1-APn.

Before describing each of functional blocks included in the machine learning device 40, the basic mechanism of reinforcement learning will be described. An agent (equivalent to the machine learning device 40 in the present embodiment) observes the state of an environment (equivalent to the numerical control device 20 and the personal computer 30) and selects an action, and the environment changes based on the selected action. As the environment changes, some reward is given, and based on the given reward, the agent performs learning to select a better action.

Whereas supervised learning shows the perfect answer, the reward in reinforcement learning is often a piecemeal value based on some change in the environment. Therefore, the agent performs learning to maximize the total of rewards obtained in the future.

Thus, in reinforcement learning, by learning an action, an appropriate action is learned based on the interactions of the action with the environment, i.e., a learning method to maximize rewards obtained in the future is learned. This represents that in the present embodiment, for example, it is possible to prevent commands for data communication from being excessively delivered to and overloading the numerical control device 20 and to select action information to reduce the delivery delay time of the commands, i.e., an action that will influence the future can be obtained.

Here, although any learning method can be used as the reinforcement learning, in the following description, Q-learning, which is a method of learning a value function Q(s,a) that selects an action a in a certain state s of the environment, is used as an example.

The purpose of Q-learning is to select an action a with the highest value function Q(s,a) as the optimal action, from actions a that can be taken in a certain state s.

However, at the time of initially starting Q-learning, the correct value of the value function Q(s,a) for the combination of a state s and an action a is not known at all. Therefore, the agent selects various actions a in a certain state s and, based on the reward given for an action a at that time, selects a better action, thereby learning a correct value function Q(s,a).

To maximize the total of rewards obtained in the future, the final goal is to achieve the following equation: $Q(s,a)=E[\Sigma(\gamma^t)r_t]$. Here, $E[\ ]$ represents the expected value, t represents the time, $\gamma$ is a parameter called the discount factor described below, $r_t$ represents the reward at time t, and $\Sigma$ is the sum at time t. The expected value in this equation is the expected value when the state changes according to the optimal action. However, since it is unknown what the optimal action is during the process of Q-learning, reinforcement learning is performed through exploration by performing a variety of actions. The update expression for such a value function Q(s,a) can be expressed, for example, by the following expression 1.

[Expression 1]
$$Q(s_{t+1}, a_{t+1}) \leftarrow Q(s_t, a_t) + \alpha\left(r_{t+1} + \gamma \max_a Q(s_{t+1}, a) - Q(s_t, a_t)\right)$$

In expression 1 above, $s_t$ represents the state of the environment at time t, and $a_t$ represents the action at time t. As a result of an action $a_t$, the state changes to $s_{t+1}$. $r_{t+1}$ represents the reward obtained from the change in the state. The term with max is a value obtained by multiplying the Q value when the action a with the highest Q value known at that time is selected in the state $s_{t+1}$ by $\gamma$. Here, $\gamma$ is a parameter of $0<\gamma\leq 1$ and is called a discount factor. $\alpha$ is a learning coefficient and is in the range of $0<\alpha\leq 1$.

The above expression 1 represents a method of updating the value function $Q(s_t,a_t)$ of the action $a_t$ in the state $s_t$ based on a reward $r_{t+1}$ returned as a result of a trial $a_t$.

This update expression indicates that, if the value of the best action, $\max_a Q(s_{t+1},a)$ in the next state $s_{t+1}$ as a result of the action at is greater than the value function $Q(s_t,a_t)$ of the action $a_t$ in the state $s_t$, $Q(s_t,a_t)$ is increased, and conversely, if it is smaller, $Q(s_t,a_t)$ is decreased. In other words, it brings the value of an action in a state closer to the value of the best action in the next state as a result of the action. In this regard, the difference depends on the discount factor $\gamma$ and the reward $r_{t+1}$, but basically the mechanism is such that the value of the best action in a state is propagated to the value of the action in the previous state.

Here, Q-learning includes a method of creating a table of Q(s,a) for all state-action pairs (s,a) to perform learning. However, the number of states may be too large to obtain the values of Q(s,a) of all state-action pairs, and thus it may take a lot of time for Q-learning to converge.

Therefore, a known deep Q-network (DQN) technique may be used. Specifically, the value function Q may be constructed using a suitable neural network, parameters of the neural network may be adjusted, thereby the value function Q may be approximated by the suitable neural network, and thus the value of the value function Q(s,a) may be calculated. The use of DQN enables the time required for Q-learning to converge to be reduced. DON is described in detail, for example, in the following non-patent document.

<Non-Patent Document>

"Human-level control through deep reinforcement learning", Volodymyr Mnih1 [online], [search conducted on Jan. 17, 2017], Internet The machine learning device 40 performs the Q-learning described above. Specifically, the machine learning device 40 learns the value function Q to be selected by using the command table CT for undelivered commands stored in the buffer (not shown) of the data communication interface unit 302, the reception time at which the data communication interface unit 302 received each command, and the delivery time at which the command processing unit 303 delivered each command via the communication processing unit 304, as the state s, and using the setting or changing of parameters to adjust the delivery schedule included in the command table CT related to the state s as the action a. Here, the "process priority Pb" and "delay factor Td" are exemplified as parameters.

The machine learning device 40 monitors commands commanded by each of the applications AP1 to APn, observes state information (state data) s including the command table CT and the reception time and delivery time of each command delivered according to the "delivery schedule" in the command table CT, and determines an action a. A reward is returned each time the machine learning device 40 determines an action a. The machine learning device 40, for example, explores the optimal action a to maximize the total of rewards in the future in a trial-and-error manner. Thus, the machine learning device 40 can select the optimal action a (i.e., "process priority Pb" and "delay factor Td") with respect to the state s including the command table CT and the reception time and delivery time of each command delivered according to the "delivery schedule" in the command table CT, which is acquired by the personal computer 30 executing the applications AP1 to APn.

Figure 3:
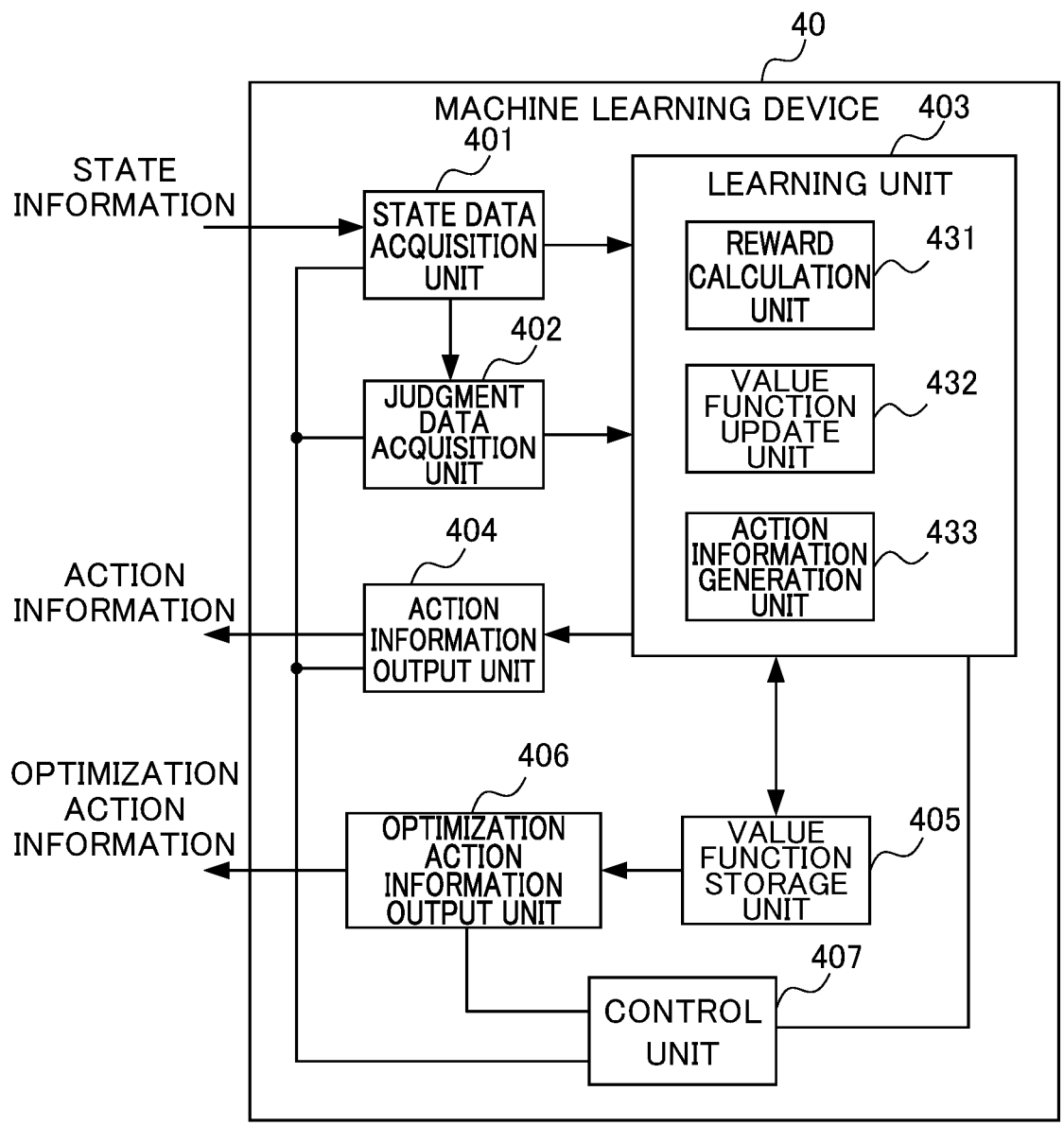
FIG. 3 is a functional block diagram showing an example of the functional configuration of a machine learning device.

FIG. 3 is a functional block diagram showing an example of the functional configuration of the machine learning device 40.

As shown in FIG. 3, to perform the reinforcement learning described above, the machine learning device 40 includes a state data acquisition unit 401, a judgment data acquisition unit 402, a learning unit 403, an action information output unit 404, a value function storage unit 405, an optimization action information output unit 406, and a control unit 407. The learning unit 403 includes a reward calculation unit 431, a value function update unit 432, and an action information generation unit 433. The control unit 407 controls the operation of the state data acquisition unit 401, the judgment data acquisition unit 402, the learning unit 403, the action information output unit 404, and the optimization action information output unit 406.

The state data acquisition unit 401 acquires, from the personal computer 30, state data s including the command table CT and the reception time and delivery time of each of commands delivered according to the "delivery schedule" of the command table CT and received within a specific time period set in advance as described below, as the state of data communication from the personal computer 30 to the numerical control device 20. The state data s is equivalent to the state s of the environment in Q-learning.

The state data acquisition unit 401 outputs the acquired state data s to the judgment data acquisition unit 402 and the learning unit 403.

The command table CT at the time of initially starting Q-learning may be set by the user as described above.

The state data acquisition unit 401 may store the acquired state data s in a storage unit (not shown) included in the machine learning device 40. In this case, the judgment data acquisition unit 402 and the learning unit 403 described below may read the state data s from the storage unit (not shown) of the machine learning device 40.

The judgment data acquisition unit 402 acquires judgment data by regularly analyzing the command table CT received from the state data acquisition unit 401 and the reception time and delivery time of each of commands received within a specific time period set in advance.

Specifically, the judgment data acquisition unit 402 acquires as judgment data, with respect to all commands received within a specific time period, the average delivery interval of all the commands received by the data communication interface unit 302 every given time period set in advance (e.g., one minute), the delivery delay time and command priority of each command, and so on. The judgment data acquisition unit 402 outputs the acquired judgment data to the learning unit 403.

The average delivery interval of the commands refers to the average value of the delivery intervals of the commands received within a given time period set in advance (e.g., one minute). The delivery delay time of each command refers to the difference between the reception time and the delivery time of each command received within a given time period set in advance (e.g., one minute).

The learning unit 403 is a part that learns the value function Q(s,a) when a certain action a is selected in a certain state data (state of the environment) s. Specifically, the learning unit 403 includes a reward calculation unit 431, a value function update unit 432, and an action information generation unit 433.

The learning unit 403 determines whether to continue learning. Whether to continue learning can be determined based on, for example, whether the number of trials since the start of machine learning has reached the maximum number of trials, or whether the elapsed time since the start of machine learning has been greater than (or equal to) a given time period.

The reward calculation unit 431 is a part that calculates a reward when an action a, which is an adjustment of the "process priority Pb" and the "delay factor Td" in the command table CT, is selected in a certain state s.

Here, an example of the calculation of the reward for the action a will be described.

Specifically, first, the reward calculation unit 431 calculates, for example, with respect to all commands received within a specific time period set in advance, an evaluation value V of each command based on the average delivery interval Ta, delivery delay time Tb, and command priority Pa acquired by the judgment data acquisition unit 402 as described above. As the specific time period set in advance, it is preferable to set a time period during which the applications AP1 to APn running on the personal computer 30 are executed in parallel. The specific time period may be the same as the above-mentioned given time period (e.g., one minute) or may include the given time period (e.g., one minute).

The following expression (expression 2) is an example of the calculation of the evaluation value.

$$V = \text{average delivery interval } Ta \times a_1 - \text{delivery delay time } Tb \times \text{command priority } Pa \times a_2 \quad \text{[Expression 2]}$$

Here, $a_1$ and $a_2$ are coefficients, for example, are respectively set to "20" and "1". The values of $a_1$ and $a_2$ are not limited to these values and may be determined according to the required accuracy of machine learning or the like.

The reward calculation unit 431 calculates the evaluation values V of all commands received within the specific time period, and assigns the average value of all calculated evaluation values as the reward r for the action a. Thus, the smaller the delivery delay time of each of the commands being judged, the greater the reward for the action a. The greater the average delivery interval of the commands being judged, the greater the reward.

FIG. 4 shows an example of the evaluation value V of each command (command number) calculated by the reward calculation unit 431. The average delivery interval Ta in expression 2 is the average value (average delivery interval) of the delivery intervals of the commands), which is "21" in the case of FIG. 4. As shown in FIG. 4, the evaluation value of each command is calculated, and the average value (=176) of all calculated evaluation values is assigned as the reward r.

The value function update unit 432 updates the value function Q stored by the value function storage unit 405 by performing Q-learning based on a state s, an action a, a state s' when the action a is applied to the state s, and a reward r calculated in the above-mentioned manner.

Updating the value function Q may be performed by way of online learning, batch learning, or mini-batch learning.

The online learning refers to a learning method to update a value function Q immediately every time a current state s changes to a new state s' by applying an action a to the current state s. The batch learning refers to a learning method in which a current state s changes to a new state s' by applying an action a to the current state s, the change is repeated, learning data is collected, and then a value function Q is updated using the collected all learning data. The mini-batch learning refers to an intermediate learning method between online learning and batch learning, in which a value function Q is updated every time some learning data is accumulated.

The action information generation unit 433 selects an action a in the process of Q-learning with respect to a current state s. In the process of Q-learning, the action information generation unit 433 generates action information a to allow an action of modifying the "process priority Pb" and "delay factor Td" in the command table CT (equivalent to an action a in Q-learning) to be taken, and outputs the generated action information a to the action information output unit 404.

More specifically, the action information generation unit 433 may incrementally increase or decrease the "process priority Pb" and "delay factor Td" included in the action a with respect to the "process priority Pb" and "delay factor Td" in the command table CT included in the state s.

When the action information generation unit 433 adjusts the "process priority Pb" and "delay factor Td" in the command table CT by the action a, and the state changes to the state s', the "process priority Pb" and "delay factor Td" in the command table CT of the next action a' may be selected according to the state of the "delivery schedule" in the command table (whether the "delivery order" and "delivery interval Ts" are appropriate).

For example, when the reward r increases due to an increase in the "process priority Pb" and/or "delay factor Td", and the "delivery order" and "delivery interval Ts" in the "delivery schedule" are appropriate, as the next action a', a policy may be taken to select an action a' that reduces the delivery delay time of a priority command and optimizes the delivery interval thereof, for example, the "process priority Pb" and/or "delay factor Td" may be incrementally increased.

Alternatively, when the reward r decreases due to an increase in the "process priority Pb" and/or "delay factor Td", as the next action a', a policy may be taken to select an action a' that reduces the delivery delay time of a priority command and optimizes the delivery interval thereof, for example, the "process priority Pb" and/or "delay factor Td" may be returned to the previous one(s).

Alternatively, when the reward r increases due to an increase in each of the "process priority Pb" and "delay factor Td", for example, each of the "process priority Pb" and "delay factor Td" may be increased by one, and when the reward r decreases, each of the "process priority Pb" and "delay factor Td" may be returned to the previous one.

Alternatively, the action information generation unit 433 may configure so as to adopt a plan that selects the action a' by a well-known method such as a greedy method of selecting the action a' having the highest quality Q(s,a) among the qualities of existing actions a estimated, or an ε-greedy method of randomly selecting the action a' with a small probability e, and selecting the action a' having the highest quality Q(s,a) other than this.

The action information output unit 404 outputs, to the personal computer 30, action information a output from the learning unit 403. The action information output unit 404 may output, to the personal computer 30, for example, updated values of the "process priority Pb" and "delay factor T" as action information. As a result, the personal computer 30 updates the command table CT based on the received updated values of the "process priority Pb" and "delay factor Td". The command processing unit 303 delivers commands for data communication to the communication processing unit 304 based on the "delivery schedule" in the updated command table CT.

The action information output unit 404 may output, to the personal computer 30, the command table CT updated based on the updated values of the "process priority Pb" and the "delay factor Td" as action information.

The value function storage unit 405 is a storage device that stores value functions Q. The value functions Q may be stored in a table (hereinafter also referred to as an "action value table") for each state s and action a, for example. The value functions Q stored by the value function storage unit 405 are updated by the value function update unit 432.

The optimization action information output unit 406 generates action information a (hereinafter referred to as "optimization action information") to cause the personal computer 30 to perform the operation that maximizes a value function Q (s,a) based on the value function Q updated by the value function update unit 432 performing Q-learning.

More specifically, the optimization action information output unit 406 acquires a value function Q stored by the value function storage unit 405. The value function Q is one updated by the value function update unit 432 performing Q-learning as described above. The optimization action information output unit 406 generates action information based on the value function Q, and outputs the generated action information to the personal computer 30. The optimization action information includes the updated values of the "process priority Pd" and "delay factor Td" similarly to the action information output by the action information output unit 404 in the process of Q-learning.

Figure 5:
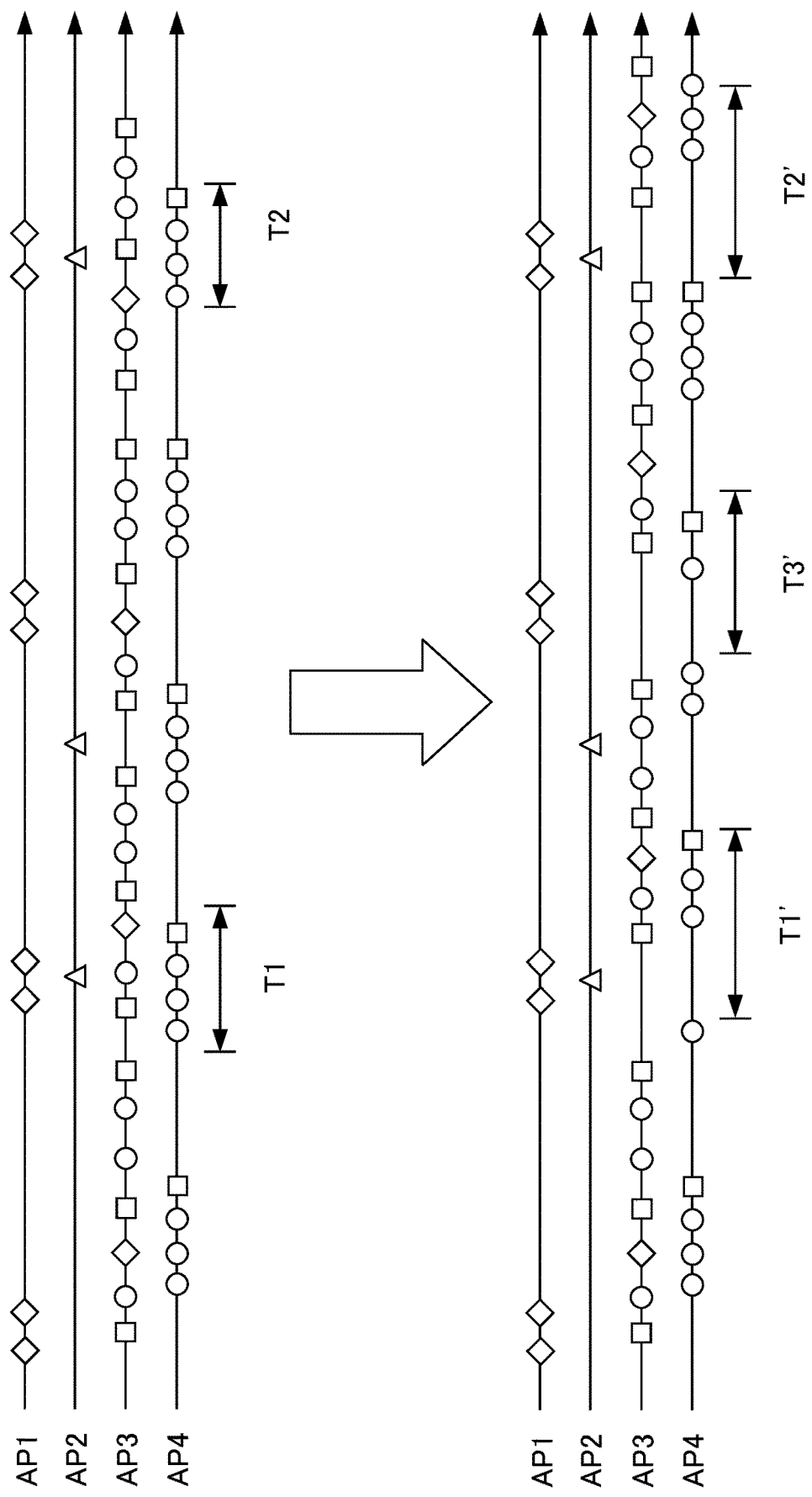
FIG. 5 shows an example of a time chart of commands before and after updating.

FIG. 5 shows an example of a time chart of commands before and after updating. The upper part of FIG. 5 shows an example of a time chart of commands (before updating) output by four applications AP1 to AP4 running on the personal computer 30, as in FIG. 10. The lower part of FIG. 5 shows an example of a time chart of commands (after updating) output by the four applications AP1 to AP4. As shown in FIG. 10, urgency increases in the order of circular, square, diamond, and triangle commands, with the triangle commands having the highest urgency. The case in which the personal computer 30 executes applications AP1 to APn, other than four applications, is the same as the case in FIG. 5, and the description thereof is omitted.

As shown in the lower part of FIG. 5, the command processing unit 303 delivers untransmitted commands based on the "delivery schedule" in the updated command table CT in which the delivery order of the commands is adjusted according the overall priority Ps. As a result, the command processing unit 303 can average the delivery interval of the commands to avoid excessive accesses at times T1' and T2', which correspond to times T1 and T2 in the upper part of FIG. 5, and at time T3'.

Thus, by updating the command table CT, the personal computer 30 can prevent the commands for data communication from being excessively delivered to and overloading the numerical control device 20, and can reduce the delivery delay time of the commands.

The functional blocks included in the machine learning device 40 have been described above.

To realize these functional blocks, the machine learning device 40 is provided with an arithmetic processor such as a CPU. In addition, the machine learning device 40 is provided with an auxiliary storage device such as a HDD that stores various control programs of application software and an operating system (OS) as well as the main storage device such as a PAM that stores data temporarily needed by the arithmetic processor to execute a program.

In the machine learning device 40, the arithmetic processor reads the application software and OS from the auxiliary storage device, causes the read application software and OS to run in the main storage device, and performs computing based on the application software and OS. Based on the computing results, various hardware included in the machine learning device 40 is controlled. Thus, the functional blocks of the present embodiment are realized. In other words, the present embodiment can be realized by hardware and software working together.

With respect to the machine learning device 40, because of the large amount of computing associated with machine learning, for example, it is desirable to install a graphics processing unit (GPU) in the personal computer and utilize the GPU for computing associated with machine learning by way of a technique called general-purpose computing on graphics processing units (GPGPU), which enables high-speed processing. In addition, for faster processing, a computer cluster may be built using multiple computers equipped with such GPUs, and the multiple computers in the computer cluster may perform parallel processing.

With reference to the flowchart in FIG. 6, the operation of the machine learning device 40 during Q-learning in the present embodiment will be described.

Figure 6:
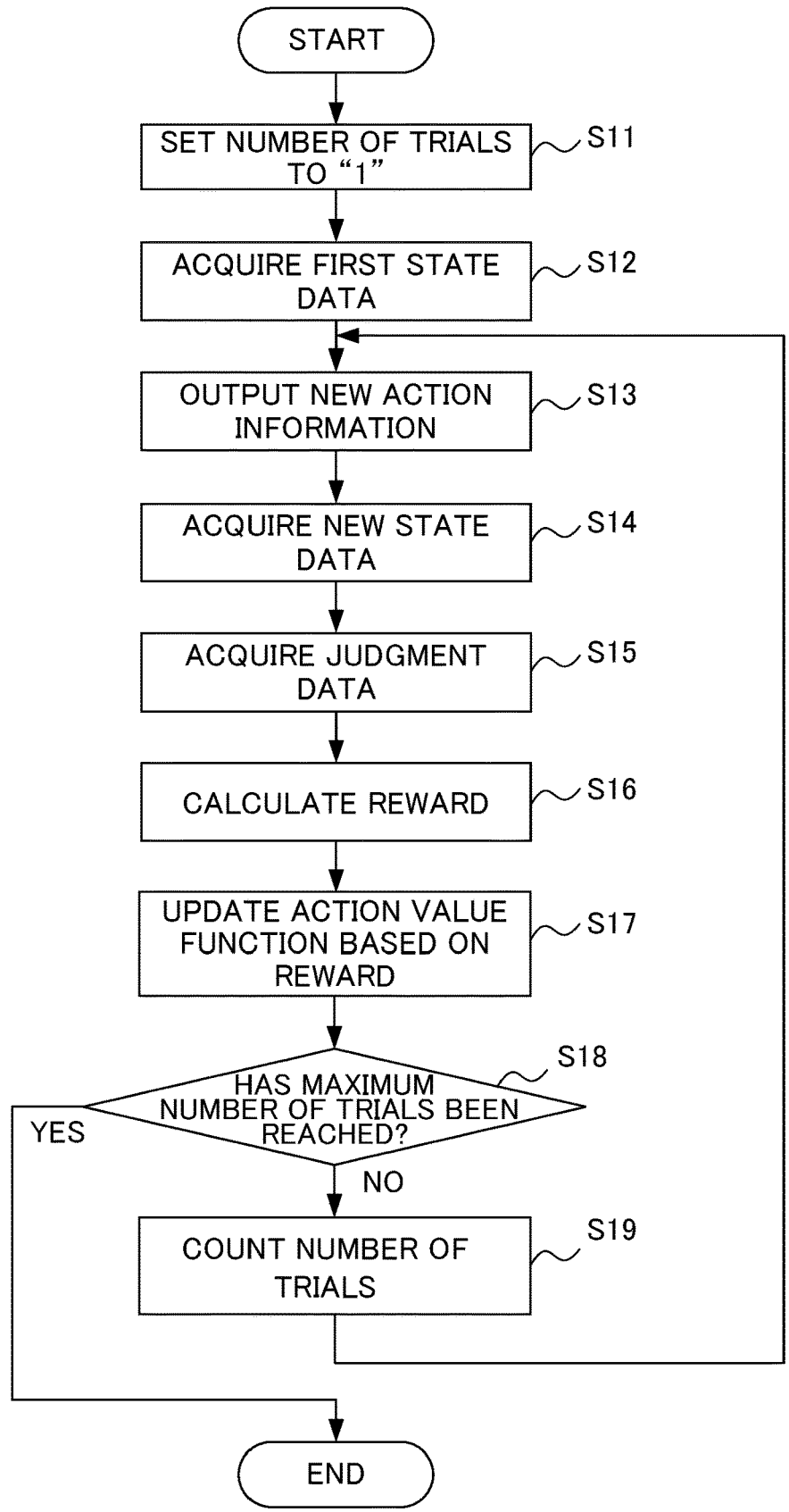
FIG. 6 is a flowchart showing the operation of a machine learning device 40 during Q-learning in one embodiment.

FIG. 6 is a flowchart showing the operation of the machine learning device 40 during Q-learning in one embodiment.

In Step 311, the control unit 407 sets the number of trials to "1" and instructs the state data acquisition unit 401 to acquire state data.

In Step S12, the state data acquisition unit 401 acquires first state data from the personal computer 30. The acquired state data is output to the action information generation unit 433. As mentioned above, the state data (state information) is the information equivalent to a state s in Q-learning, and includes the command table CT at the time of Step S12 and the reception time and delivery time of each command delivered according to the "delivery schedule" in the command table CT. The command table CT at the time of initially starting Q-learning shall be generated by the user in advance.

In Step S13, the action information generation unit 433 generates new action information a, and outputs the generated new action information a to the personal computer 30 via the action information output unit 404. The personal computer 30, which received the action information, updates the "process priority Pb" and "delay factor Td" related to a current state s based on the received action information a to change the state s to a state s'. The personal computer 30 updates the state s to the state s' based on the updated action a. Specifically, the personal computer 30 updates the command table CT. The command processing unit 303 delivers untransmitted commands stored in the buffer (not shown) in the data communication interface unit 302 based on the "delivery schedule" in the updated command table CT.

In Step S14, the state data acquisition unit 401 acquires state data equivalent to the new state s' acquired from the personal computer 30. Here, the new state data includes the command table CT related to the state s' and the reception time and delivery time of each command delivered according to the "delivery schedule" in the command table CT. The state data acquisition unit 401 outputs the acquired state data to the judgment data acquisition unit 402 and the learning unit 403.

In Step S15, the judgment data acquisition unit 402 acquires judgment data every given time period (e.g., one minute) based on the command table CT included in the new state data received by the state data acquisition unit 401 and the reception time and delivery time of each command for all commands received within a specific time period set in advance. The judgment data acquisition unit 402 outputs the acquired judgment data to the learning unit 403. The judgment data includes, for example, the average delivery interval Ta of commands received by the data communication interface unit 302 every given time period, such as one minute, the delivery delay time Tb and the command priority Pa of each command.

In Step S16, the reward calculation unit 431 calculates the evaluation value V of each command for all commands received within the specific time period set in advance based on the acquired judgment data, i.e., the average delivery interval Ta of the commands, the delivery delay time Tb and the command priority Pa of each command, and expression 2. The reward calculation unit 431 assigns the average value of the evaluation values V of the commands as the reward r.

In Step S17, the value function update unit 432 updates the value function Q stored by the value function storage unit 405 based on the calculated reward r.

In Step S18, the control unit 306 determines whether the number of trials has reached the maximum number of trials since the start of machine learning. The maximum number of trials is set in advance. If the maximum number of trials has not been reached, in Step S19, the number of trials is counted and the process returns to Step S13. The process from Step S13 to Step S19 is repeated until the maximum number of trials is reached.

Although the flow in FIG. 6 terminates the process when the number of trials has reached the maximum number of trials, the process may be terminated on the condition that the accumulated time of the process from Step S13 to Step 19 since the start of machine learning has been greater than (or equal to) maximum elapsed time set in advance.

In Step S17, online updating is exemplified, but batch or mini-batch updating may be performed instead of online updating.

The operation described above with reference to FIG. 6 in the present embodiment can prevent the commands for data communication from being excessively delivered to and overloading the numerical control device 20, and generate the value function Q for generating the action information to reduce the delivery delay time of the commands.

Figure 7:
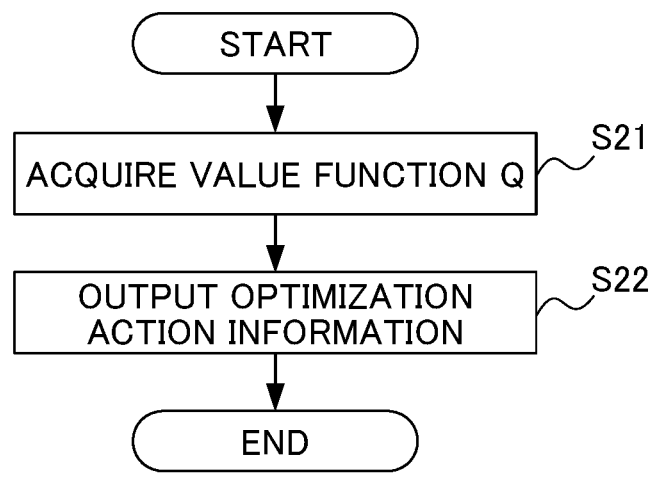
FIG. 7 is a flowchart showing the operation during the generation of optimization action information by an optimization action information output unit.

With reference to the flowchart in FIG. 7, the operation when the optimization action information is generated by the optimization action information output unit 406.

In Step S21, the optimization action information output unit 406 acquires the value function Q stored by the value function storage unit 405. The value function Q is one updated by the value function update unit 432 performing Q-learning as described above.

In Step S22, the optimization action information output unit 406 generates optimization action information based on the value function Q and outputs the generated optimization action information to the personal computer 30.

As described above, by updating the command table CT, the personal computer 30 can prevent the commands for data communication from being excessively delivered to and overloading the control device, and can reduce the delivery delay time of the commands.

Although one embodiment has been described above, the personal computer 30 and the machine learning device 40 are not limited to the embodiment described above and can be modified and improved to the extent that the object can be achieved.

<Modification 1>

In the above embodiment, the machine learning device 40 is exemplified as a device different from the personal computer 30, but the personal computer 30 may include some or all of the functions of the machine learning device 40.

Alternatively, for example, a server may include part or all of the state data acquisition unit 401, the judgment data acquisition unit 402, the learning unit 403, the action information output unit 404, the value function storage unit 405, the optimization action information output unit 406, and the control unit 407 of the machine learning device. Alternatively, each function of the machine learning device 40 may be realized using virtual server functions or the like on a cloud.

Alternatively, the machine learning device 40 may be a distributed processing system, in which the functions of the machine learning device 40 are distributed to multiple servers as appropriate.

<Modification 2>

Figure 8:
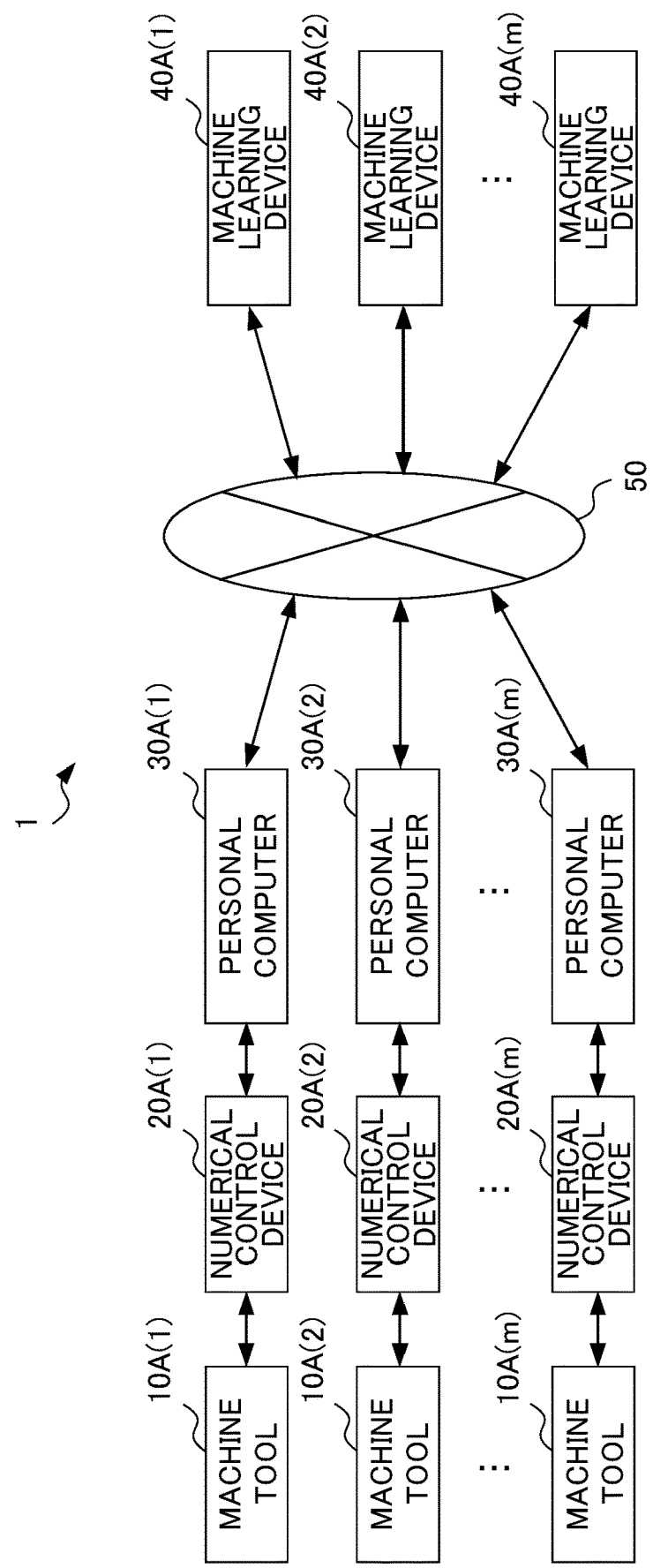
FIG. 8 shows an example of the configuration of a control system.

For example, in the embodiment described above, in the control system 1, one personal computer 30 and one machine learning device 40 are communicably connected to each other, but the present invention is not limited thereto. For example, as shown in FIG. 8, the control system 1 may include m number of personal computers 30A(1) to 30A(m) and m number of machine learning devices 40A(1) to 40A(m) (m is an integer of 2 or more). In this case, the machine learning device 40A(j) may be connected to the personal computer 30A(j) in a one-to-one communication manner over a network 50, and machine learning may be performed with respect to the personal computer 30A(j) (j is an integer of 1 to m).

The value function Q stored by the value function storage unit 405 of the machine learning device 40A(j) may be shared with another machine learning device 40A(k) (k is an integer of 1 to m and k≠j). If the value function Q is shared among the machine learning devices 40A(1) to 40A(m), each machine learning device 40A can perform reinforcement learning in a distributed manner, thereby improving the efficiency of reinforcement learning.

The personal computers 30A(1) to 30A(m) are respectively connected to numerical control devices 20A(1) to 20A(m), and the numerical control devices 20A(1) to 20A (m) are respectively connected to machine tools 10A(1) to 10A(m).

The machine tools 10A(1) to 10A(m) each correspond to the machine tool 10 in FIG. 1. The numerical control devices 20A(1) to 20A(m) each correspond to the numerical control device 20 in FIG. 1. The personal computers 30A(1) to 30A(m) each correspond to the personal computer 30 in FIG. 1. The machine learning devices 40A(1) to 40A(m) each correspond to the machine learning device 40 in FIG. 1.

Figure 9:
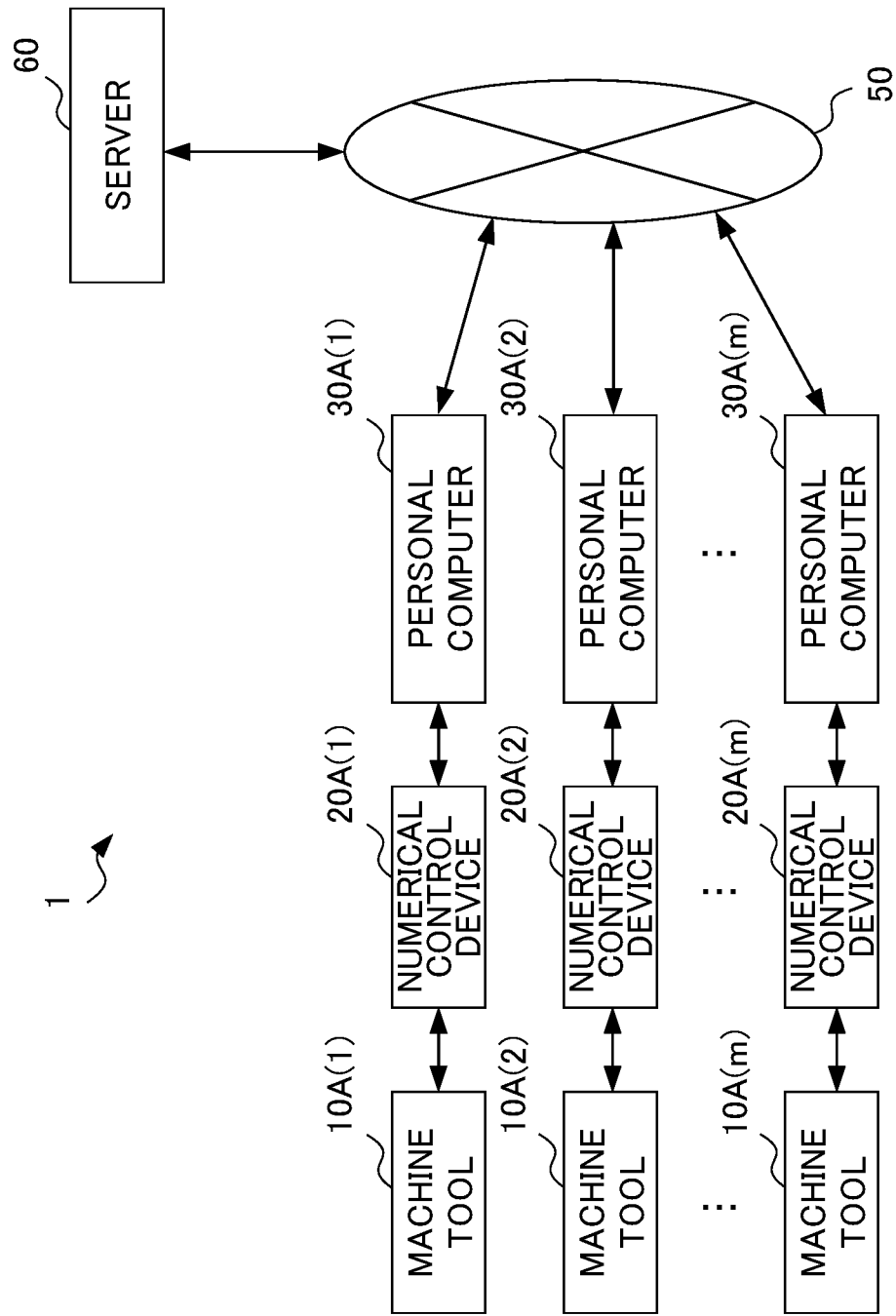
FIG. 9 shows an example of the configuration of a control system.

As shown in FIG. 9, a server 60 may operate as the machine learning device 40, may be communicably connected to the m number of personal computers 30A(1) to 30A(m) over the network 50, and may perform machine learning with respect to each of the personal computers 30A(1) to 30A(m)

<Modification 3>

Alternatively, although in the above embodiment, the process priority Pb and delay factor Td are used as parameters to adjust the delivery schedule, parameters other than the process priority Pb and delay factor Td may be used, for example.

Each function included in the personal computer 30 and the machine learning device 40 in one embodiment can be realized by hardware, software, or a combination thereof. Here, "realized by software" means that it is realized by the computer reading and executing the program.

Each constituent unit included in the personal computer 30 and the machine learning device 40 can be realized by hardware including electronic circuits, etc., software, or a combination thereof. When a constituent unit is realized by software, the program constituting the software is installed on the computer. These programs may be distributed to a user by being recorded on removable media or by being downloaded to the user's computer over a network. When a constituent unit is configured by hardware, some or all of the functions of each constituent unit in the above devices can be configured by an integrated circuit (IC) such as an application specific integrated circuit (ASIC), a gate array, a field programmable gate array (FPGA), and a complex programmable logic device (CPLD).

The programs can be stored by way of various types of non-transitory computer readable media and can be supplied to the computer. The non-transitory computer readable media include various types of tangible storage media. Examples of the non-transitory computer readable media include magnetic recording media (e.g., flexible disks, magnetic tape, hard disk drives), magneto-optical recording media (e.g., magneto-optical disks), CD-ROMs (read only memories), CD-Rs, CD-R/Ws, semiconductor memories (e.g., mask ROMs, PROMs (programmable ROMs), EPROMs (erasable PROMs), flash ROMs, and RAMs). The programs may be supplied to the computer by way of various types of transitory computer readable media. Examples of the transitory computer readable media include electrical signals, optical signals, and electromagnetic waves. The transitory computer readable media can supply the programs to the computer via wired communication paths, such as wire and optical fiber, or wireless communication paths.

The step of describing a program recorded on a recording medium includes not only processing performed chronologically according to the sequence but also processing performed in parallel or individually without necessarily being processed chronologically.

In other words, the machine learning device, computer device, control system, and machine learning method of the present disclosure can take various different embodiments having the following configurations.

(1) A machine learning device 40 of the present disclosure is a machine learning device for performing machine learning with respect to a personal computer 30 that issues a command for accessing a numerical control device 20 communicably connected to the personal computer 30. The machine learning device 40 includes a state data acquisition unit 401, an action information output unit 404, a reward calculation unit 431, and a value function update unit 432. The state data acquisition unit 401 monitors the command for accessing data in the numerical control device 20, the command being commanded by each of one or more applications AP1 to APn running on the personal computer 30, and acquires state data including at least a delivery schedule of the command and a reception time and a delivery time of the command delivered based on the delivery schedule. The action information output unit 404 outputs, to the personal computer 30, action information a including modification information of the delivery schedule included in the state data. The reward calculation unit 431 calculates a reward r for the action information a based on a delivery delay time Tb of each of the commands until each of the commands is delivered to the numerical control device 20 and an average delivery interval Ta of all of the commands delivered. The value function update unit 432 updates a value function Q related to the state data and the action information a based on the reward r calculated by the reward calculation unit 431.

The machine learning device 40 can prevent the commands for data communication from being excessively delivered to and overloading the control device, and can reduce the delivery delay time of the commands.

(2) In the machine learning device 40 described in (1), the modification information a of the delivery schedule may include a process priority Pb indicating a priority of a process that commands the command and a delay factor Td that delays delivery of the command.

This enables the machine learning device 40 to optimally adjust the delivery schedule.

(3) in the machine learning device 40 described in (1) or (2), the reward calculation unit 431 may calculate an evaluation value V of each of the commands based on the delivery delay time Tb of each of the commands and the average delivery interval Ta, and may assign an average value of the calculated evaluation values V of the commands as the reward r.

This enables the machine learning device 40 to accurately calculate the reward.

(4) The machine learning device 40 described in any one of (1) to (3) may further include an optimization action information output unit 406 that outputs the action information a that maximizes a value of the value function Q based on the value function Q updated by the value function update unit 432.

This enables the machine learning device 40 to acquire a more optimal delivery schedule.

(5) in the machine learning device 40 described in any one of (1) to (4), the numerical control device 20 may be a control device for industrial machine.

This enables the machine learning device 40 to be applied to control devices for machine tools, robots, and others.

(6) In the machine learning device 40 described in any one of (1) to (5), the machine learning may be performed with a maximum number of machine learning trials set.

This enables the machine learning device 40 to avoid machine learning taking place over a long period of time.

(7) A personal computer 30 of the present disclosure includes the machine learning device 40 described in any one of (1) to (6), and the delivery schedule is machine-learned by the machine learning device 40.

The personal computer 30 can achieve the same effects as those of (1) to (6).

(8) A control system 1 of the present disclosure includes the machine learning device 40 described in any one of (1) to (6) and a computer device in which the delivery schedule is machine-learned by the machine learning device 40.

The control system 1 can achieve the same effects as those of (1) to (6).

(9) A machine learning method of the present disclosure is a machine learning method for performing machine learning with respect to a personal computer 30 that issues a command for accessing a numerical control device 20 communicably connected to the personal computer 30. The machine learning method includes: monitoring the command for accessing data in the numerical control device 20, the command being commanded by each of one or more applications AP1 to APn running on the personal computer 30, and acquiring state data including at least a delivery schedule of the command and a reception time and a delivery time of the command delivered based on the delivery schedule; outputting, to the personal computer 30, action information including modification information of the delivery schedule included in the state data; calculating a reward r for the action information based on a delivery delay time Tb of each of the commands until each of the commands is delivered to the numerical control device 20 and an average delivery interval Ta of all of the commands delivered; and updating a value function Q related to the state data and the action information based on the calculated reward r.

The machine learning method can achieve the same effects as those of (1).

EXPLANATION OF REFERENCE NUMERALS

1 control system
10 machine tool
20 numerical control device
30 personal computer
301 central processing unit
302 data communication interface unit
303 command processing unit
304 communication processing unit
305 storage unit
40 machine learning device
401 state data acquisition unit
402 Judgment data acquisition unit
403 learning unit
404 action information output unit
405 value function storage unit
406 optimization action information output unit

The invention claimed is:

1. A machine learning device for performing machine learning with respect to a computer device that issues a command for accessing a control device communicably connected to the computer device, the machine learning device comprising:
a state data acquisition unit that monitors the command for accessing data in the control device, the command being commanded by each of one or more applications running on the computer device, and acquires state data including at least a delivery schedule of the command and a reception time and a delivery time of the command delivered based on the delivery schedule;
an action information output unit that outputs, to the computer device, action information including modification information of the delivery schedule included in the state data;
a reward calculation unit that calculates a reward for the action information based on a delay time of each of the commands until each of the commands is delivered to the control device and an average delivery interval of all of the commands delivered; and
a value function update unit that updates a value function related to the state data and the action information based on the reward calculated by the reward calculation unit.

2. The machine learning device according to claim 1, wherein the modification information of the delivery schedule includes a process priority indicating a priority of a process that commands the command and a delay factor that delays delivery of the command.

3. The machine learning device according to claim 2, wherein the reward calculation unit calculates an evaluation value of each of the commands based on the delay time of each of the commands and the average delivery interval, and assigns an average value of the calculated evaluation values of the commands as the reward.

4. The machine learning device according to claim 2, further comprising an optimization action information output unit that outputs the action information that maximizes a value of the value function based on the value function updated by the value function update unit.

5. The machine learning device according to claim 2, wherein the control device is a control device for industrial machine.

6. The machine learning device according to claim 2, wherein the machine learning is performed with a maximum number of machine learning trials set.

7. A computer device comprising the machine learning device according to claim 2, wherein the delivery schedule is machine-learned by the machine learning device.

8. A control system comprising:

the machine learning device according to claim 2; and a computer device in which the delivery schedule is machine-learned by the machine learning device.

9. The machine learning device according to claim 1, wherein the reward calculation unit calculates an evaluation value of each of the commands based on the delay time of each of the commands and the average delivery interval, and assigns an average value of the calculated evaluation values of the commands as the reward.

10. The machine learning device according to claim 1, further comprising an optimization action information output unit that outputs the action information that maximizes a value of the value function based on the value function updated by the value function update unit.

11. The machine learning device according to claim 1, wherein the control device is a control device for industrial machine.

12. The machine learning device according to claim 1, wherein the machine learning is performed with a maximum number of machine learning trials set.

13. A computer device comprising the machine learning device according to claim 1, wherein the delivery schedule is machine-learned by the machine learning device.

14. A control system comprising:

the machine learning device according to claim 1; and a computer device in which the delivery schedule is machine-learned by the machine learning device.

15. A machine learning method for performing machine learning with respect to a computer device that issues a command for accessing a control device communicably connected to the computer device, the machine learning method comprising:

monitoring the command for accessing data in the control device, the command being commanded by each of one or more applications running on the computer device, and acquiring state data including at least a delivery schedule of the command and a reception time and a delivery time of the command delivered based on the delivery schedule;

outputting, to the computer device, action information including modification information of the delivery schedule included in the state data;

calculating a reward for the action information based on a delay time of each of the commands until each of the commands is delivered to the control device and an average delivery interval of all of the commands delivered; and updating a value function related to the state data and the action information based on the calculated reward.

* * * * *